Figure 1:
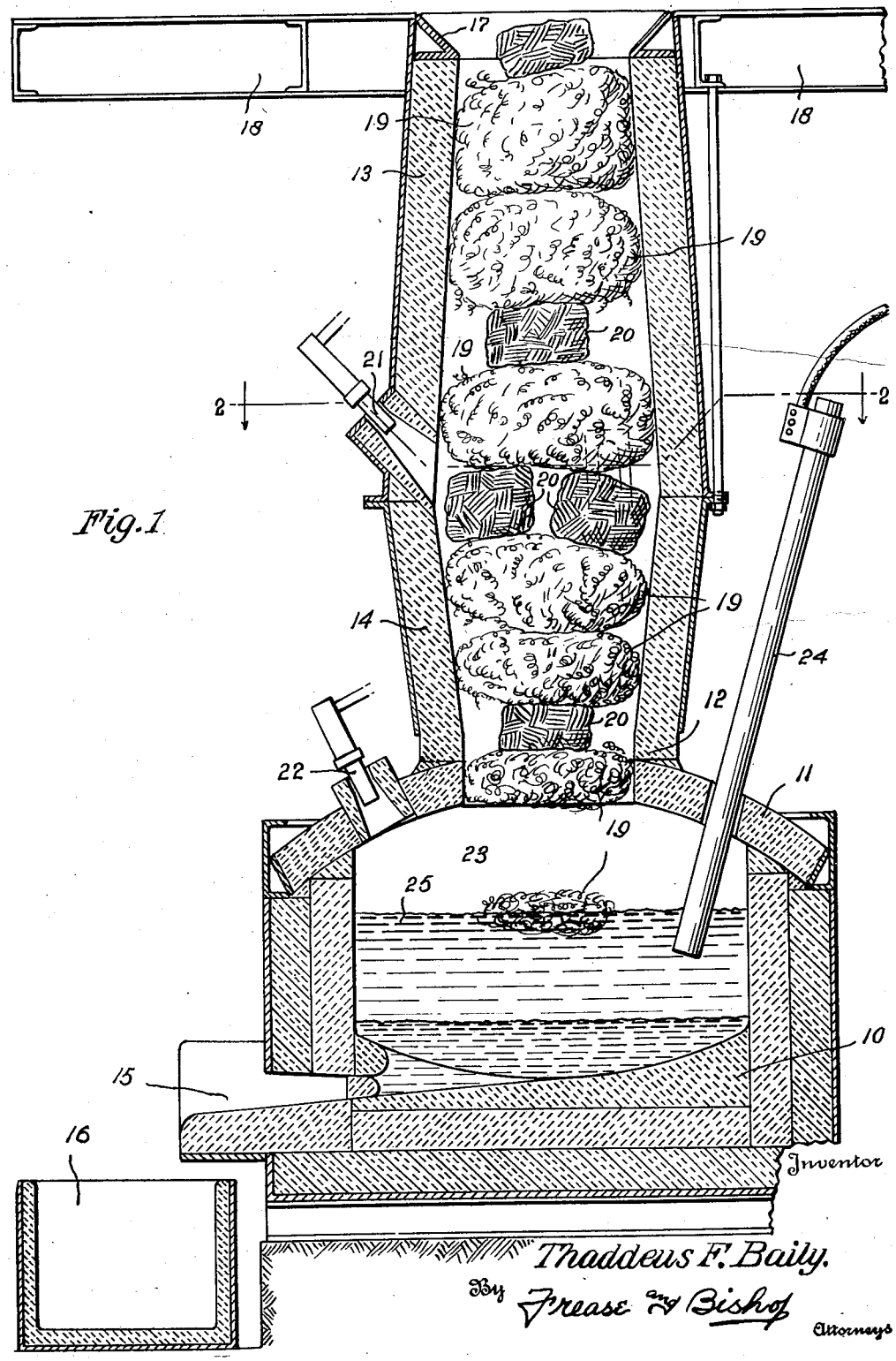

Aug. 14, 1945.  T. F. BAILY  2,382,534
METHOD OF MELTING AND REFINING FERROUS METALS
Filed Nov. 11, 1944    2 Sheets-Sheet 1

Inventor
Thaddeus F. Baily.
By Frease & Bishop
Attorneys

Aug. 14, 1945.  T. F. BAILY  2,382,534
METHOD OF MELTING AND REFINING FERROUS METALS
Filed Nov. 11, 1944  2 Sheets-Sheet 2

Inventor
Thaddeus F. Baily
By Frease and Bishop
Attorneys

Patented Aug. 14, 1945

2,382,534

UNITED STATES PATENT OFFICE 2,382,534

METHOD OF MELTING AND REFINING FERROUS METALS

Thaddeus F. Baily, Canton, Ohio

Application November 11, 1944, Serial No. 563,055

12 Claims. (Cl. 75—12)

The invention relates to the melting and refining of scrap metal and more particularly to a method of utilizing long turnings of steel scrap. The class of ferrous scrap which is commonly known as long turnings is produced by machining operations, particularly from the machining of alloy steels which are so springy that they can not be readily baled and which in subsequent handling usually become so tangled and matted that they can not be readily separated.

These turnings are usually too tough to crush or shred readily and can not be ordinarily charged into the open hearth, or electric furnaces from the usual charging boxes, nor can they be readily fed through the usual skip-hoist and bell of a blast furnace for the reason that in handling they generally form large masses of extremely light specific gravity and can only be compressed by pressing at sufficiently high temperature to soften them.

Since this class of scrap is handled with such great difficulty and delay in melting time in the conventional electric, or open hearth steel making furnace, it is not suitable for use in such furnaces. Such of the scrap as has been utilized has, after shredding or briquetting, been charged into the blast furnace, and since most of it contains appreciable amounts of alloys the pig iron produced is contaminated with unpredictable amounts of these alloys resulting in the pig iron and steel building up with alloy which seriously effects the analysis and physical properties of all steel made from pig iron in which scrap is a part of the charge, as well as the contamination of foundry grade pig iron with undesirable alloys. The introduction of this class of scrap into the blast furnace, in order to recover the iron, not only contaminates the iron for steel making purposes, but results in the loss of the alloy elements in this scrap.

The object of the present invention is to provide a process for economically and commercially handling such long turnings and the like in a melting and refining operation.

It is a further object of the invention to provide a process for refining light steel turnings and the like into refined metal of desired purity without first preparing the charge, as by briquetting or bundling.

Another object is the provision of a process for melting and refining such ferrous scrap without carburizing the metal by charging it in alternate layers with coke as in the cupola, the light turnings providing sufficient porosity in the charge for allowing the gases from the combustion by the fuel to pass upward therethrough.

A further object of the invention is the provision of a process for melting and refining long turnings together with heavier miscellaneous scrap, such as small bundles, bales and the like which may be charged with the light turnings and supported thereby as the charge descends through the furnace.

Still another object of the invention is to provide a process for melting and refining scrap in which considerably less kilowatt hours are required than in usual practice.

A further object is to provide such a process where the peak demand for electricity is less than where the melting and refining are carried out in a conventional electric furnace.

A still further object of the invention is to provide a method of melting scrap having the ability to produce low carbon metal and even to lower the carbon content of the metal during the melting operation.

More specifically the objects of the invention are the provision of a process for melting and refining ferrous metal scrap such as long turnings, and the like by feeding the scrap with slag forming constituent to the top of an open shaft type furnace through which the charge gradually descends and is preheated by the gases formed by the combustion of fuel and air in the lower portion of the shaft, and after preheating the metal is melted and refined in the hearth portion of the furnace which may be heated by fuel or electricity or both.

Figure 2:
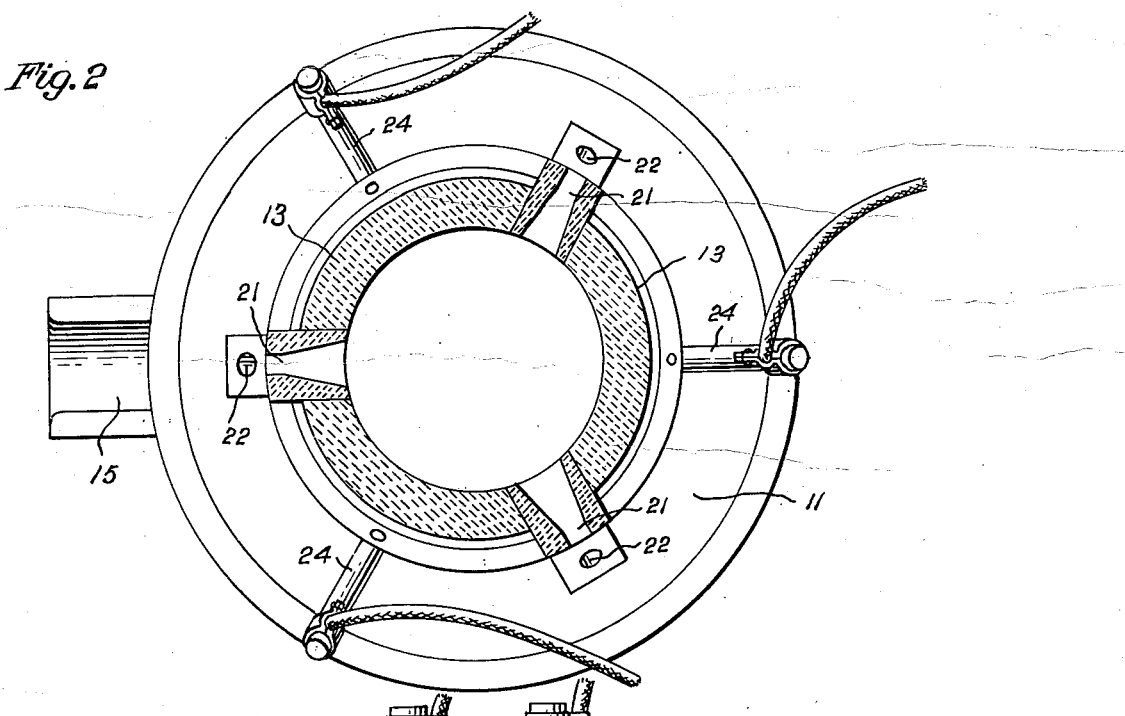

The above objects together with others which will be apparent from the drawings and following description, or which may be later referred to, may be attained by carrying out the hereinafter described process by means of apparatus such as illustrated in the accompanying drawings, in which:

Figure 1 is a vertical, sectional view through a shaft type melting and preliminary refining furnace with electric heated hearth for melting the materials of the charge;

Fig. 2 a section taken as on the line 2—2, Fig. 1; and

Figure 3:
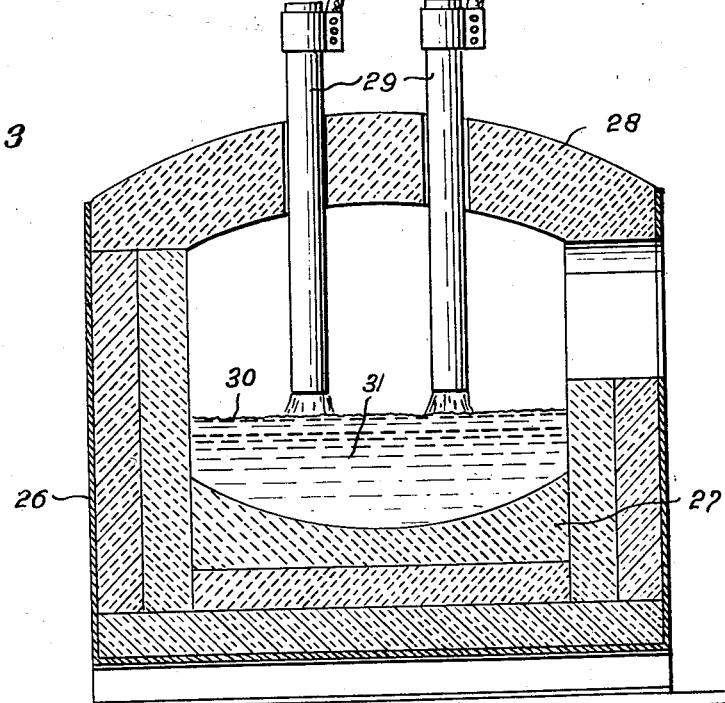

Fig. 3 a vertical sectional view of an electric furnace for finishing the metal to required specification.

Referring first to Figs. 1 and 2 of the drawings, a shaft type furnace is illustrated comprising generally the hearth section 10, the roof 11, the throat 12 and the upper shaft section 13 having the bosh section 14 at its lower end communicating with the hearth section 10.

A tap spout 15 is provided in the hearth section of the furnace from which the molten, partially refined metal may be tapped into a ladle 16 and transferred to the electric furnace illustrated in Fig. 3 for final refining and finishing of the metal.

For the purpose of feeding the charge, the upper stack 13 of the furnace is provided with an open top 17, surrounded by the scrap metal storage platform 18, from which may be charged light metal turnings as shown at 19, without previous preparation, and if desired, a certain proportion of bundled material, or heavier scrap, as indicated at 20.

These light, long metal turnings, which as charged frequently weigh only about 15 pounds per cubic foot, and are generally of a springy nature so that they can not readily be briquetted unless heated to a softening temperature, may be charged by hand from the platform 18 into the top 17 of the furnace stack, or in large installations a grab bucket or other convenient means may be used for charging the scrap. With each charge of light turnings there may be fed quantities of the heavier scrap or bundled material which will be supported upon the mass of light turnings as the charge descends through the furnace stack.

Fuel and air, or air alone if the turnings are particularly oily, may be introduced into the lower portion of the upper stack, adjacent the upper end of the bosh 14, through the burners 21, for preheating the charge and burning off any oil and sulphur that may be on the materials of the charge, and preheating and calcining any flux material.

As the charge is preheated it descends into the bosh section 14, the light metal turnings lose their stiffness and are slightly compressed as they pass into the throat 12, and finally drop into the hearth section 10, in a preheated condition resulting from the introduction of fuel and air through the burners 22 located through the roof of the hearth section, which may be adjusted so as to provide a non-oxidizing atmosphere in the combustion chamber 23.

As the materials of the charge leave the hearth section of the furnace they are melted, preferably by means of electric heat supplied through the electrodes 24, which may operate as arcs as in the conventional electric melting furnace, but under most conditions a deep bath of slag is carried as indicated at 25, the electrodes being immersed in the slag as shown in Fig. 1 of the drawings, the slag being maintained at the desired temperature by the electric heat. In such an operation the charge will be melted as it passes through the slag and will not be subject to the extremely high temperature of an electric arc as is common in conventional electric steel melting furnaces.

Not only does the shaft of the melting furnace serve as a chamber for preheating the charge, but the downwardly tapered bosh section 14 provides means for holding the charge in the shaft of the furnace for a sufficiently long time to bring the charge to a high temperature before it descends into the hearth section.

As above stated the open top 17 of the furnace stack permits the charging of light turnings without previous preparation, and since this forms a porous charge there is ample space for the combustion gases to pass upward therethrough for preheating. Furthermore this light, porous portion of the charge forms a support for the bundles, or other heavier material, which would otherwise drop immediately to the hearth of the furnace without preheating.

The temperature of the combustion gases both in the shaft and combustion chamber of the furnace may be placed under complete control by means of any suitable automatic air and fuel ratio control instruments of any standard type, so as to provide a suitable proportion of fuel and air for any desired temperature of the furnace atmosphere throughout the entire preheating operation, the final melting and refining being carried out by electric heat in the hearth of the furnace.

Thus the preheating, melting and refining are under complete control throughout the entire operation, which may be carried on substantially continuously except during the tapping period, at which time the fuel supplied to the furnace may be shut off so as to substantially stop the discharge of the metal from the shaft to the hearth of the furnace.

In the event the scrap metal of the charge contains undesirable oxidizable elements such as phosphorous, it is preferable that an oxidizing slag be carried for removing such impurities. When the charge is low in phosphorous, it is preferred that a high lime slag be carried, free from oxidizing elements for removing the sulphur.

Where stainless steel scrap, or other scrap high in chromium, is being melted it is desirable to maintain the carbon content of the finished metal as low as possible and it is desirable to carry a slag high in chrome oxide which may contain as much as 25% $Cr_2O_3$. Similarly a high manganese slag may be carried when the scrap is high in manganese and it is desirable to produce low carbon metal.

Although under some conditions it may be feasible to cast the metal into the ladle 16 and pour it directly into ingot molds, or in some cases it may be desirable to cast into pigs for shipment to other plants for remelting, the molten metal is preferably transferred from the ladle 16 to the electric finishing furnace shown in Fig. 3 and indicated generally by the numeral 26, where the metal may be refined and finished to specifications.

This furnace may be of any usual and well known design of electric furnace including the hearth section 27, the roof 28 having electrodes 29 located therethrough for operation as in usual electric furnace practice.

The furnace 26 may use a slag of different composition than that used in the melting furnace, for example an oxidizing slag may be used in the melting furnace shown in Fig. 1 and a deoxidizing or finished slag as indicated at 30 may be carried over the molten metal 31 in the finishing furnace, under which the desired alloy additions or corrections for composition may be made.

It will be seen that one advantage of the new process is that light scrap, such as long turnings, may be fed into the shaft type melting furnace without any previous preparation and that heavy scrap can be fed with the charge of light turnings which will support the heavier scrap and permit the whole charge to descend gradually through the stack to the hearth of the furnace allowing sufficient time for preheating the charge.

This preheating of the charge is accomplished by fuel at high efficiency, since the shaft is operated on the counter flow principle and thus less than half as much electricity is required as in cases where all of the heating is done by electricity, as in the conventional electric steel making furnace where light scrap can not be efficiently charged or melted on account of its bulky nature.

By transferring the metal in fluid condition from the melting furnace to the finishing furnace less power is required than when a normal heavy scrap charge is melted in a conventional steel melting furnace. The molten metal transferred from the melting furnace is of known analysis before it is charged into the finishing furnace, and has had a preliminary refining so that only one slag is required in the finishing furnace instead of the usual two slag operation where the first slag is an oxidizing slag and the second slag a deoxidizing and finishing slag.

The new process not only requires less kilowatt hours as compared with operations where both the melting and refining are carried on in a conventional furnace, but the peak demand for electricity is less with the two furnaces which run substantially at a uniform power input at all times, while when the melting and refining are both done in a conventional electric furnace it is customary during the melting down period to use several times as much power as in the refining period.

The new method of melting continuously in a shaft type furnace and refining in a conventional electric furnace thus not only saves about half the power otherwise required, at a small additional expense for fuel, but produces a substantially uniform load on the power line, effecting a lower cost per kilowatt hour than when the melting and refining are carried on in one furnace.

A further obvious advantage of this method of melting over the cupola or blast furnace, is the ability to produce low carbon metal, and even to lower the carbon content of the metal during the melting operation, while in both the blast furnace and cupola the metal is carburized and must subsequently be oxidized by blowing in a Bessemer convertor, or by the use of an oxidizing slag in the finishing furnace, which removes all of the chromium, manganese, and other oxidizable elements as well as the carbon.

Furthermore the long turnings such as are particularly desirable for use in this process, can not be used in the blast furnace without shredding or briquetting, which at best is an expensive operation, and the long alloy turnings which are particularly stiff or springy, can not be successfully shredded or briquetted. Thus it is clear that this process provides an efficient means for processing a class of scrap that can not be economically handled in any other way.

It will further be seen that by the use of the new process the alloy elements in the light alloy steel scrap may be recovered so as to provide alloy steels of definite chemical composition and physical properties. It is thus evident that the new process is of particular advantage in the melting of light alloy turnings without previous preparation, not only because alloy turnings are difficult to briquette or shred, but because alloy scrap should not be charged into a blast furnace or cupola, where it can serve only to contaminate the resulting metal and waste the contained alloy, but should be utilized directly in the steel making operation where the scrap may be segregated and the alloy contained therein utilized in the production of alloy steels of similar specifications, either with or without the addition of alloys to meet the specifications for the finished steel.

The improved process therefore provides a means of conveniently and economically melting light alloy steel scrap together with heavier scrap, by the combined use of fuel and electric power, producing fluid, low carbon metal suitable either for pigging as heavy melting scrap for use in open hearth or electric furnaces, or providing fluid metal for an electric furnace charge greatly increasing the output of the finishing furnace over the present method of using a cold scrap charge or for casting directly into ingots when scrap of known analysis is charged to the melting furnace.

I claim:

1. That method for melting ferrous base, low carbon, high melting point long turnings which consists in charging such material into the open top of a shaft type furnace provided with an electrically heated hearth, preheating the charge in a reducing atmosphere as it descends through the lower part of the shaft by passing all products of combustion upwardly from the hearth through the shaft and out of the open top of the shaft and maintaining said products of combustion in a reducing atmosphere in the lower part of the shaft, and melting the preheated material with electric heat in the hearth of the furnace, producing low carbon metal.

2. That method for melting ferrous base, low carbon, high melting point long turnings which consists in charging such material along with slag making materials into the open top of a shaft type furnace provided with an electrically heated hearth, preheating the charge in a reducing atmosphere as it descends through the lower part of the shaft by passing all products of combustion upwardly from the hearth through the shaft and out of the open top of the shaft and maintaining said products of combustion in a reducing atmosphere in the lower part of the shaft, melting and refining the molten metal by means of an electrically heated refining slag in the hearth of the furnace, producing low carbon metal.

3. The method of melting ferrous base, low carbon, high melting point long turnings which consists in charging such material into the open top of a shaft type furnace and permitting the charge to descend slowly through the shaft to the hearth of the furnace, burning off oil and sulphur from the charge with an oxidizing flame and preheating the charge in a reducing atmosphere as it descends through the shaft, and finally melting the preheated charge with electric heat in the hearth of the furnace.

4. The method of melting ferrous base, low carbon, high melting point long turnings which consists in charging such material into the open top of a shaft type furnace and permitting the charge to descend slowly through the shaft to the hearth of the furnace, burning off oil and sulphur from the charge with an oxidizing flame and preheating the charge in a reducing atmosphere as it descends through the shaft, and finally melting the preheated charge with electric heat under an oxidizing slag in the hearth of the furnace.

5. The method of melting ferrous base, low carbon, high belting point long turnings which consists in charging such material into the open top of a shaft type furnace and permitting the charge to descend slowly through the shaft to the hearth of the furnace, burning off oil and sulphur from the charge with an oxidizing flame and preheating the charge in a reducing atmosphere as it descends through the shaft, and finally melting the preheated charge with electric heat under an oxidizing slag in the hearth of the furnace, then transferring the molten metal to a finishing furnace and refining and finishing the charge with electric heat under a deoxidizing and refining slag.

6. The method of melting ferrous base, low carbon, high melting point long turnings which consists in charging loose masses of such material into the open top of a shaft type furnace and permitting the charge to descend slowly through the shaft to the hearth of the furnace, burning off oil and sulphur from the charge with an oxidizing flame and preheating the charge in a reducing atmosphere as it descends through the shaft, and finally melting the preheated charge with electric heat in the hearth of the furnace.

7. The method of melting ferrous base, low carbon, high melting point long turnings and heavier scrap which consists in charging loose masses of the long turnings into the open top of a shaft type furnace, supporting bundles of heavier scrap upon said long turnings and permitting the entire charge to descend slowly through the shaft to the hearth of the furnace, preheating the charge in a reducing atmosphere as it descends through the shaft and finally melting the preheated charge with electric heat in the hearth of the furnace.

8. The method of melting ferrous base, low carbon, high melting point long turnings and heavier scrap which consists in charging loose masses of the long turnings into the open top of a shaft type furnace, supporting bundles of heavier scrap upon said long turnings and permitting the entire charge to descend slowly through the shaft to the hearth of the furnace, preheating the charge in a reducing atmosphere as it descends through the shaft and finally melting the preheated charge with electric heat under an oxidizing slag in the hearth of the furnace.

9. The method of melting ferrous base, low carbon, high melting point long turnings which consists in charging loose masses of such material into the open top of a shaft type furnace, and permitting the charge to descend slowly through the shaft to the hearth of the furnace, preheating the charge in a reducing atmosphere as it descends through the shaft and melting the preheated charge with electric heat in the hearth of the furnace.

10. The method of melting ferrous base, low carbon, high melting point long turnings which consists in charging loose masses of such material into the open top of a shaft type furnace, and permitting the charge to descend slowly through the shaft to the hearth of the furnace, preheating the charge in a reducing atmosphere as it descends through the shaft and melting the preheated charge with electric heat under an oxidizing slag in the hearth of the furnace.

11. The method of melting ferrous base, low carbon, high melting point long turnings and heavier scrap which consists in charging loose masses of the long turnings into the open top of a shaft type furnace, supporting bundles of heavier scrap upon said long turnings, supporting the charge partly upon the shaft walls and partly upon the slightly compressed long turnings in the throat of the shaft and permitting the entire charge to descend slowly through the shaft to the hearth of the furnace, preheating the charge in a reducing atmosphere as it descends through the lower part of the shaft by passing all products of combustion upwardly from the hearth through the shaft and out of the open top of the shaft and maintaining said products of combustion in a reducing condition in the lower part of the shaft and finally melting the preheated charge with electric heat in the hearth of the furnace.

12. The method of melting low carbon, high melting point long turnings which consists in charging such material into the open top of a shaft type furnace provided with an electrically heated hearth and permitting the charge to descend slowly through the shaft to the hearth of the furnace, preheating the charge in the shaft in a reducing atmosphere by passing all products of combustion upwardly from the hearth through the shaft and out of the open top of the shaft, burning off oil and sulphur from the charge in an oxidizing atmosphere by admitting air to the shaft at a point intermediate its ends and melting the preheated material with electric heat in the hearth of the furnace.

THADDEUS F. BAILY.